United States Patent
Jourdan et al.

(10) Patent No.: US 6,490,383 B1
(45) Date of Patent: Dec. 3, 2002

(54) HYBRID SPATIAL AND WAVELENGTH SELECTOR AND OPTICAL SWITCHING MATRIX INCLUDING IT

(75) Inventors: Amaury Jourdan, Sevres (FR); Franck Bruyere, Paris (FR); Dominique Chiaroni, Antony (FR); Ludovic Noirie, Bagneux (FR)

(73) Assignee: Alcatel, Paris (FR)

( * ) Notice: Subject to any disclaimer, the term of this patent is extended or adjusted under 35 U.S.C. 154(b) by 117 days.

(21) Appl. No.: 09/624,994

(22) Filed: Jul. 25, 2000

(30) Foreign Application Priority Data

Aug. 9, 1999 (FR) .............................. 99 10312

(51) Int. Cl.$^7$ .............................. G02B 6/26; G02B 6/42
(52) U.S. Cl. .............................. 385/17; 385/24; 385/16; 359/128; 359/117
(58) Field of Search .............................. 385/24, 15–23; 359/115, 118, 117, 120, 121, 123, 135, 128

(56) References Cited

U.S. PATENT DOCUMENTS

| | | | |
|---|---|---|---|
| 5,937,117 A | * | 8/1999 | Ishida et al. ............... 359/123 |
| 5,953,142 A | * | 9/1999 | Chiaroni et al. ........ 250/227.12 |
| 6,055,077 A | * | 4/2000 | Needle et al. .............. 359/125 |

FOREIGN PATENT DOCUMENTS

| | | |
|---|---|---|
| EP | 0 429 046 A2 | 5/1991 |
| EP | 0 853 440 A2 | 7/1998 |

OTHER PUBLICATIONS

"Design and implementation of a fully reconfigurable all–optical crossconnect for high capacity multiwavelength transport networks" Jourdan,et al., Lightwave Technology, Journal of, vol.: 14 Issue 6, Jun. 1996, pp.: 1198–1206.*

"A 2.56 Tb/s throughput packet/cell–based optical switch–fabric demonstrator" Araki, et al., Optical Communication, 1998. 24th European Conference on, vol.: 3, 1998, pp.: 125–129 vol. 3.*

* cited by examiner

Primary Examiner—Hemang Sanghavi
Assistant Examiner—Scott Knauss
(74) Attorney, Agent, or Firm—Sughrue Mion, PLLC

(57) ABSTRACT

A hybrid spatial and wavelength selector for optical switching matrices includes a guide system defining paths between input ports receiving light waves having diverse wavelengths and at least one output port. Gates on the paths are each opened or closed so that the light waves reaching the output port via the gates which are open are selected according to the input ports which received them and according to their wavelength. The guide system is situated only between the optical gates and the output port and includes a wavelength separation system assigning some of the paths to the light waves according to their wavelength. The selector has applications in fiber optic telecommunication networks.

10 Claims, 3 Drawing Sheets

HYBRID SPATIAL AND WAVELENGTH SELECTOR AND OPTICAL SWITCHING MATRIX INCLUDING IT

BACKGROUND OF THE INVENTION

1. Field of the Invention

The present invention finds an application in data transmission networks, in which light waves are guided by fibers after they have been modulated to carry data to be transmitted.

2. Description of the Prior Art

Before they are modulated the light waves usually have various predetermined wavelengths referred to as the network wavelengths. The present invention relates to the production of switching matrices which are included in the nodes of such networks and more specifically to the production of selectors used in such matrices. A selector has one or more input ports at which it receives some of said light waves. It also receives a selection instruction in the form of an electrical signal designating at least one of the light waves. It has one or more output ports to which it transmits some of the light waves, as indicated by the instruction.

A selector can be of a type referred to as a spatial selector. It then has a plurality of input ports and selects the light waves according to the input port(s) at which they are received. It can instead be of a type referred to as a wavelength selector. It then selects the light waves according to their wavelength. When a particular wavelength is referred to hereinafter, or it is stated that light waves having a particular wavelength are selected, or that a path is assigned to a wavelength, the implication will be that the wavelength concerned is one of the network wavelengths, that the light waves selected are some of the light waves previously mentioned, and that a path is assigned to those light waves. The light waves selected are not only pure light waves, i.e. unmodulated light waves having a precise network wavelength, but also, and more typically, carrier light waves which result from modulating a corresponding pure light wave with data to be transmitted and which therefore cover a wavelength band including that wavelength. The width of that wavelength band is typically around 0.1 nm for a data bit rate of 10 Gbit/s. Any light wave whose wavelength is in that band or sufficiently close to it would then also be selected. A light wave of this kind is referred to hereinafter as one "associated" with the network wavelength.

A selector is referred to as a "hybrid" selector hereinafter if it is both a spatial selector and a wavelength selector. A typical selector of this kind transmits to its single output port light waves which are received at one of its input ports and have one of the network wavelengths, that port and that wavelength being those designated by the selection instruction.

In the selectors considered hereinafter a light wave is selected by opening an optical gate. Because that gate is not sensitive either to the input port of the light wave or to its wavelength, it can assure its selection function only because it is situated on a path assigned to that light wave. In the case of a wavelength selector, it is therefore necessary to associate a specific system with the selector to assign various paths to the light waves according to their wavelength. Such a system is referred to hereinafter as a "wavelength separation system".

First and second hybrid selectors known in the art both include first a spatial selector and then a wavelength selector, in the upstream to downstream direction defined by the direction of propagation of the light waves. Each selector has a plurality of input ports respectively connected to a plurality of output ports by optical gates. An intermediate system connects each output port of the spatial selector to each input port of the wavelength selector. It constitutes a wavelength separation system because, of the light waves that it receives from each of the output ports, it transmits to each of the input ports only the light waves which are associated with a single network wavelength and depend on the input port. An output system connects each of the output ports of the wavelength selector to the output port of the hybrid selector.

The first of the selectors known in the art is described in the article "Design and Implementation of a Fully Reconfigurable All-optical Cross-connect for High-capacity Multiwavelength Transport Network" by A. Jourdan et al, IEEE Journal of Lightwave Technology, vol 14 No. 6, p. 1198, June 1996.

It has the disadvantage, where the power of the light waves to be transmitted is concerned, that its intermediate system combines the losses of a combiner receiving the light waves at the output of the spatial selector and those of a multiplexer thereafter performing the wavelength separation.

This is why, in the second hybrid selector known in the art, the intermediate system consists of a router which orients the light waves according to their wavelength as soon as they leave the spatial selector.

The second selector known in the art is described in the article "A 2.56 Tb/s Throughput Packet/Cell-Based Optical Switch-Fabric Demonstrator", S. Araki, S. Takahashi, Y. Maeno, Y. Suemura, A. Tajima, H. Takahashi, K. Matsuda, T. Tamanuki, S. Dohmae, N. Henmi-ECOC'98, 20–24 September, Madrid, Spain. It has the disadvantage that the carrier light waves which it transmits are subject to a high level of noise.

One particular object of the present invention is to provide in a simple and low-cost manner a hybrid selector which combines low internal losses with low output noise.

SUMMARY OF THE INVENTION

To this end, it provides a hybrid spatial and wavelength selector for optical switching matrices, the selector including guide means defining paths between input ports receiving light waves having diverse wavelengths and at least one output port and a plurality of gates on the paths each adapted to be opened or closed so that the light waves reaching the output port via the gates which are open are selected according to the input ports which received the light waves and according to the wavelengths, wherein the guide means are situated only between the plurality of optical gates and the output port and include a wavelength separation system assigning some of the paths to the light waves according to their wavelength.

To enable some of the optical gates of the hybrid selectors known in the art to implement the wavelength selection function, the wavelength separation system of those selectors has always been located on the paths taken by the light waves on the upstream side of these gates. The inventors decided that, to assign certain paths to certain wavelengths, a system of the above kind could just as well operate on the light waves after they have passed through all the optical gates, but it also became apparent that the new arrangement has advantages of its own: it offers the designer of an optical switching matrix a wider choice in terms of the arrangement of the intermediate paths between the gates, and therefore reduces either the optical power losses on those paths or the noise at the output of the selector, at no additional cost.

The above advantages will be better understood in the light of the following description, which is given by way of example and with reference to the accompanying diagrammatic drawings.

DETAILED DESCRIPTION OF THE PREFERRED EMBODIMENTS

Like the two prior art selectors, the hybrid selector SH of the invention includes a spatial selector and a wavelength selector.

The spatial selector SS includes a succession of n optical gates such as the gates G1 and G2 respectively associated with a succession of n input ports such as the ports A1 and A2 of the hybrid selector and a succession of n output ports such as the ports B1 and B2 of the spatial selector. Each of the gates is adapted to be either open or closed, on command, so as to connect selectively the input and output ports which are associated with the gate. The light waves received at an input port associated with a gate of the above kind which is open are transmitted to the output port associated with the same gate, where they constitute output light waves of the spatial selector. Each gate conventionally comprises a semiconductor optical amplifier whose electrical power supply is cut off when the gate must be closed. When it is open, it applies a gain of (for example) 18 dB to the power of the light waves passing through it. It also has its own inherent noise, which degrades the signals carried by those light waves.

The wavelength selector SW includes a succession of m optical ports such as the ports H1 and H2 respectively associated with a succession of m input ports such as the ports C1 and C2 of the wavelength selector and a succession of m output ports such as the ports D1 and D2 of the same selector. The letter m designates the number of network wavelengths. These ports are of the same type as those of the selector SS, so that each is adapted to be either open or closed, on command, to connect selectively together the input and output ports which are associated with that gate. As its name indicates, the function of the selector SW is to select light waves according to their wavelength. However, the optical gates which constitute it are not sensitive to those wavelengths. This is why they must be placed on respective paths assigned to the network wavelength. The set of paths followed by the light waves is defined by the guide means of the selector with the result that assigning some of them to particular wavelengths must be carried out by a wavelength separation system included in those means.

The guide means include:

an intermediate system adapted to connect each of the output ports such as the ports B1 and B2 of the spatial selector SS to each of the input ports such as the ports C1 and C2 of the wavelength selector SW, and an output system connecting each of the output ports such as the ports D1 and D2 of the wavelength selector to the output port E of the hybrid selector.

Figure 2:
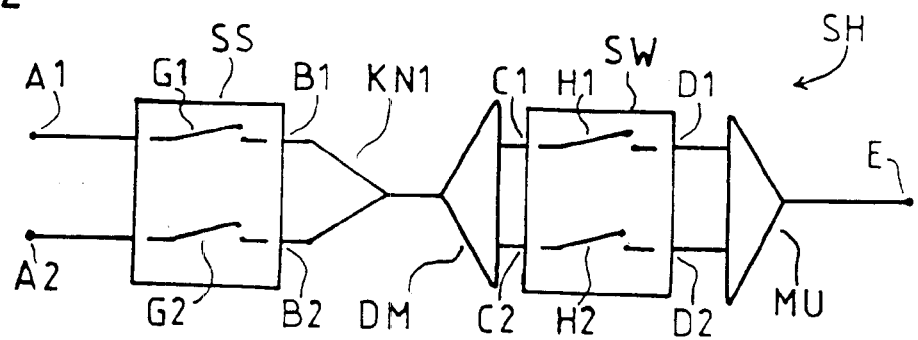
FIG. 2 shows a first prior art hybrid selector.

In the first prior art hybrid selector previously mentioned and shown in FIG. 2 the intermediate system includes a combiner KN1 of class n×1 which assembles together all of the light waves that can appear at the output of the spatial selector SS and a demultiplexer DM which routes each of those light waves, according to its wavelength, to one of the input ports of the wavelength selector SW. The output system consists of a multiplexer MU.

Figure 5:
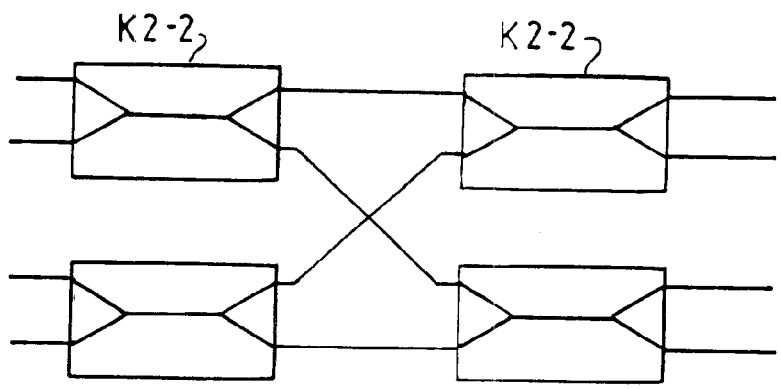
FIG. 5 is a simplified representation of a coupler that can be included in the selector shown in FIG. 4.

The combiner KN1 can be made up of a succession of stages formed by four-branch couplers such as the coupler K2.2 shown in FIG. 5. If the number n is equal to $2^q$, where q is an integer, a combiner of the above kind generates losses of at least 3.q dB in the power of each light wave. For example, if n=32, the loss is at least 15 dB, for example 18 dB. Like the multiplexer MU, the demultiplexer DM routes the light waves according to their respective wavelengths and causes losses in the power of each light wave which are almost independent of the number m and of the order of 5 dB to 10 dB. The first prior art hybrid selector then has the disadvantage that the losses suffered by a light wave between the spatial selector and the wavelength selector, for example 18 dB+10 dB=28 dB, are too great to be easily compensated by the gain of the optical gate through which that light wave will pass in the wavelength selector.

Figure 3:
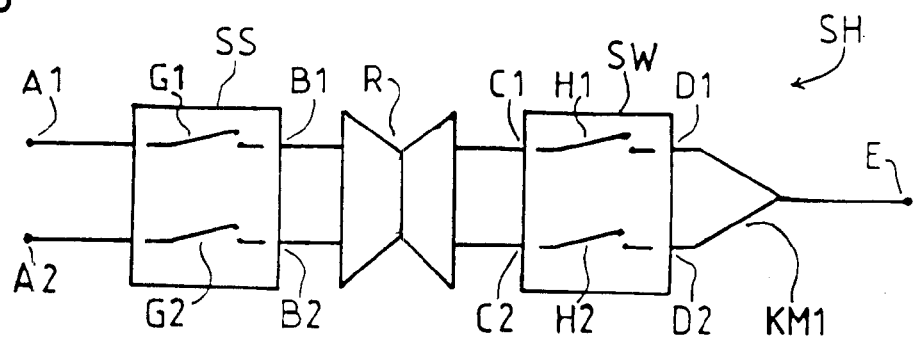
FIG. 3 shows a second prior art hybrid selector.

In the second prior art hybrid selector, shown in FIG. 3, the intermediate system takes the form of a router R. The router transmits each output light wave from the spatial selector SS to an input port such as the port C1 or C2 of the wavelength selector SW. That port depends both on the wavelength of the light wave and of the port, such as the port B1 or the port B2, through which that light wave was transmitted at the output of the spatial selector. The output system consists of a combiner KM1 of class m×1. The losses of the router R are similar to those of a multiplexer or a demultiplexer and are therefore compensated by the gain of the optical gates. The losses of the combiner KM1 are those indicated above for the combiner KN1. For example, they are around 18 dB if m=32.

Figure 4:
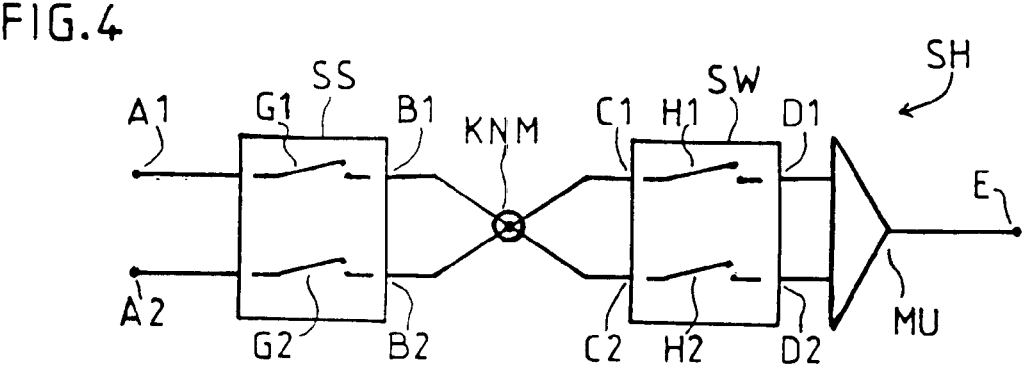
FIG. 4 shows a hybrid selector according to the invention.

As shown in FIG. 4, the hybrid selector SH of the invention is characterized in that its intermediate system KNM defines independent paths for the output light waves of the spatial selector 55 which are independent of their respective wavelengths and in that its output system MU thereby of itself constitutes its wavelength separation system. In other words, the system MU respectively associates a succession of predetermined wavelength ranges with the succession of output ports of the wavelength selector SW and transmits a light wave from one of those output ports such as the port D1 or D2 to the output port E of the hybrid selector only if the wavelength of that light wave is in the range associated with that port. A wavelength range of this kind typically contains light waves associated with a single network wavelength. This need not be the case, however.

The intermediate assembly KNM preferably takes the form of a "star" coupler of class n×m. The coupler is referred to as an "intermediate" coupler. It has an input for each of the output ports such as the ports B1 and B2 of the spatial selector SS and an output port for each of the input ports such as the ports C1 and C2 of the wavelength selector SW. It connects each of its inputs to each of its outputs.

It is even more preferable if the number n of output ports of the spatial selector SS and the number m of input ports of the wavelength selector SW are equal. For example, they are both equal to $2^p$ if the intermediate coupler KNM consists of a succession of p stages each including $n^{p-1}$ couplers of class 2×2. The numbers m and n are therefore both equal to 32, for example, but they could instead be equal to 16 or 64, depending on the required capacity of a switching matrix using the selector and on how the technology evolves. However, for these values of these numbers the KNM coupler preferably has a structure of a type known in the art and not including such stages. Nevertheless, even in this case choosing to make the numbers m and n the same minimizes the losses of a coupler of class n×m, which are then substantially the same as those of the combiner of class n×1 that was used in the first prior art selector. FIG. 5 shows a simplified case in which a coupler of this kind is of the multistage type and m=n=4.

The m successive network wavelengths are spaced by 0.8 nm from approximately 1530 nm to approximately 1560 nm, for example.

The output system MU advantageously consists of a multiplexer of a type known in the art for associating a narrow range of wavelengths with each of its inputs so that the system efficiently filters noise downstream of each gate of the wavelength selector. Also, the losses and the cost of a multiplexer of the above kind are limited so that, compared to the second prior art selector, the advantage of efficient filtering is obtained without a trade-off in terms of the optical power balance, and even with advantage as far as the economic balance is concerned. The multiplexer MU is referred to hereinafter as the "output multiplexer".

Figure 6:
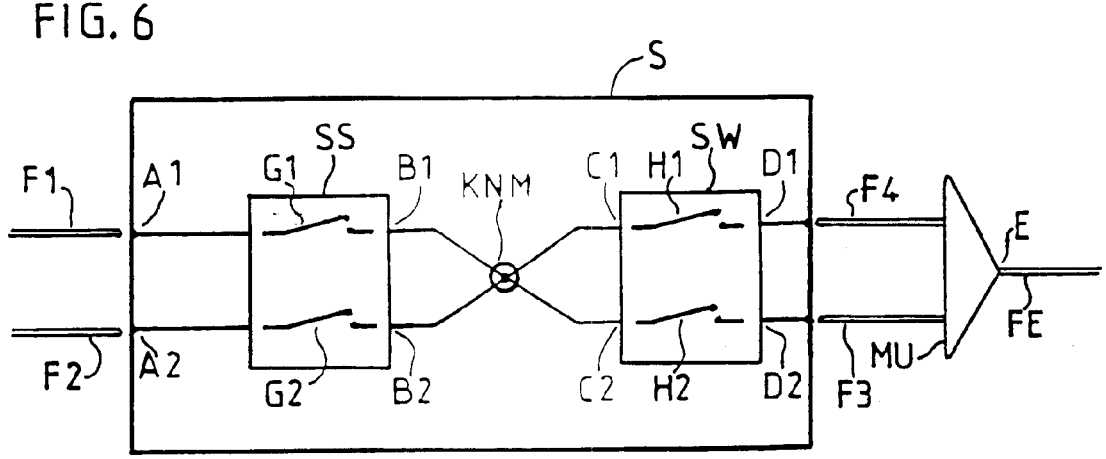
FIG. 6 shows a first embodiment of the selector shown in FIG. 4.
Figure 7:
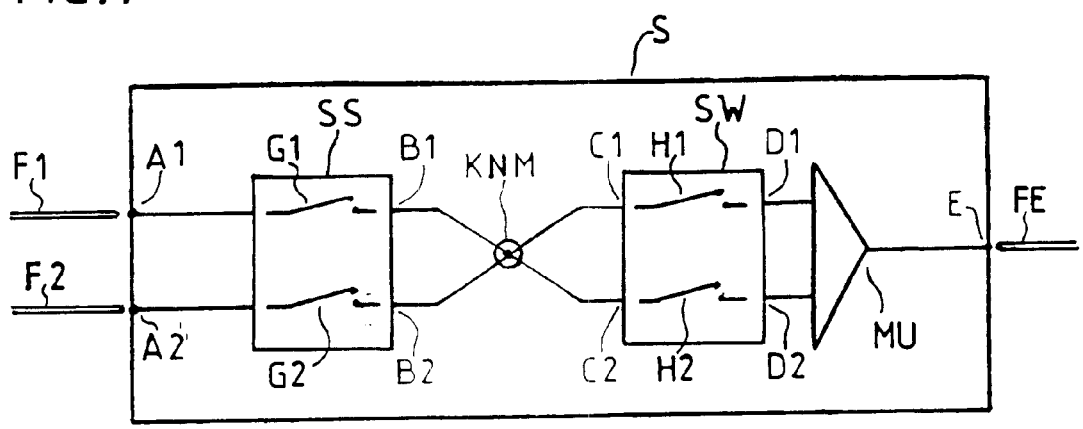
FIG. 7 shows a second embodiment of the selector shown in FIG. 4.

The hybrid selector of the present invention can advantageously be wholly or partially integrated on a silicon substrate such as the substrate S shown in FIGS. 6 and 7. The input ports such as the ports A1 and A2 of the selector are then fed from a bundle of fibers such as the fibers F1 and F2 and its output gate E feeds an output optical fiber FE. The fibers are represented by double lines and the optical waveguides formed in the substrate are represented by single lines.

As shown in FIG. 6, the gates such as the gates G1, G2, H1 and H2 constituting the spatial and wavelength selectors SS and SW are formed in one or two indium phosphide wafers fixed to the substrate S. The intermediate coupler KNM can be formed in the same wafer, but it may be advantageous to form it on the substrate using the SiO2/Si technique. The optical waveguides of the combiner are then formed in the silica and the selector is "hybridized" because its components are formed in two different basic materials. The output gates such as the gates D1 and D2 then feed the output multiplexer MU via a bundle of fibers such as the fibers F3 and F4. The multiplexer can be chosen from various types known in the art.

As shown in FIG. 7, the substrate S of a second embodiment carries the same elements as are carried by the substrate shown in FIG. 6, and also the output multiplexer MU. Like the intermediate coupler, the multiplexer can be formed either on an indium phosphide wafer including the selectors SS and SW or on a silicon wafer attached to the substrate S. It is then preferably of the arrayed waveguide grating type.

Figure 1:
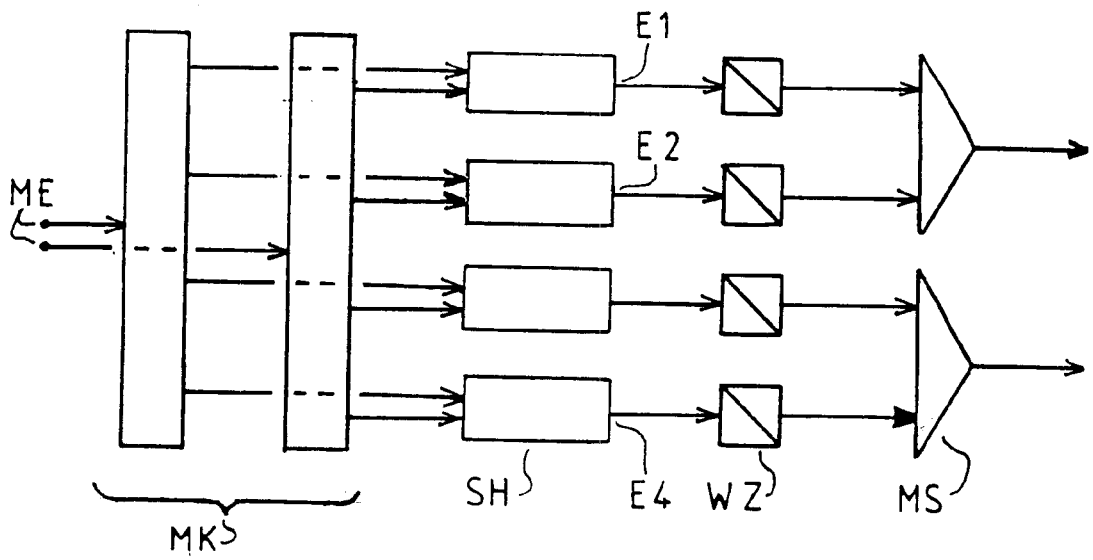
FIG. 1 is a simplified representation of a switching matrix of a type known in the art including hybrid selectors, which can be either selectors according to the invention or prior art selectors.

The invention also provides an optical switching matrix shown in FIG. 1. The matrix includes:

n matrix inputs such as the input ME each adapted to receive an input multiplex made up of light waves associated with m network wavelengths, m.n hybrid selectors such as the selector SH each having n input ports such as the ports A1 and A2 and one output port such as the ports E1 to E4 and each adapted to receive a selection instruction and to connect the output port to one of the input ports designated by the instruction for one of the wavelengths designated by the instruction, and an input coupler MK connecting each of the matrix inputs such as the input ME to each of the input ports such as the ports A1 and A2 of the hybrid selectors.

Compared to matrices known in the art, the above matrix is characterized in that at least some of its hybrid selectors are in the form of the selector SH previously described.

To facilitate comprehension, FIG. 1 shows the highly simplified case in which m=n=2.

It is often beneficial if at least some of the output ports, such as the ports E1 to E4, and for example all of them, each feed a transponder such as the transponder WZ whose functions include wavelength matching and/or signal regeneration.

In another such arrangement at least some of the output ports, such as the ports E1 to E4, and for example all of them, form groups each including a plurality of such ports, for example m such ports, such as the ports E1 and E2, and all the output ports of each of the groups feed a multiplexer of the group, such as the multiplexer MS.

A matrix of the above kind typically constitutes an essential component of a node of a fiber optic network. In this case some inputs of the matrix are fed with light waves from another node of the network and other inputs are fed with light waves introduced into the network via the node including the matrix. Outputs of the matrix each comprise the output port of a hybrid selector, either the output of a transponder or that of a multiplexer of one of said hybrid selector groups. Some of the matrix outputs feed fibers connected to another node of the network and others feed fibers specific to the node including the matrix, which further includes a control unit (not shown) which is informed of the traffic to be routed via the network. In response the unit provides various signals such as the selection instructions which control the optical gates of the selectors such as the selector SH.

There is claimed:

1. A hybrid spatial and wavelength selector for optical switching matrices, said hybrid selector including guide means defining paths between input ports receiving light waves having diverse wavelengths and at least one output port and a plurality of gates on said paths each adapted to be opened or closed so that said light waves reaching said output port via said gates which are open are selected according to said input ports which received said light waves and according to said wavelengths, wherein said guide means comprises a wavelength separation system between said optical gates and said output port and downstream of all of said optical gates and assigning some of said paths to said light waves according to their wavelength.

2. The hybrid spatial and wavelength selector claimed in claim 1, including:

a spatial selector including a succession of n optical gates respectively associated with a succession of n input ports of said hybrid selector and a succession of n output ports of said spatial selector, n being an integer, and each of said n optical gates being adapted to be either opened or closed on command respectively either to connect or not to connect one of said n input ports associated with one of said n optical gates to one of said n output ports associated with one of said n optical gates to enable light waves received at said n input port associated with said n optical gate which is open to be transmitted tosaid n output port associated with said n optical gate to constitute the output light waves of said spatial selector having respective wavelengths, a wavelength selector including a succession of m optical gates respectively associated with a succession of m input ports of said wavelength selector and a succession of m output ports of said wavelength selector, m being an integer, and each of said m optical gates being adapted to be either open or closed on command either to connect or not to connect one of said m input ports associated with said m optical gate to one of said m output ports associated with said m optical gate, and said guide means, which include:

an intermediate system adapted to connect each of said n output ports of said spatial selector to each of said m input ports of said wavelength selector and to define paths for said output light waves of said spatial selector which are independent of their respective wavelengths, and an output system connecting each of said m output ports of said wavelength selector to said output port of said hybrid selector, respectively associating a succession of predetermined ranges of wavelengths with said succession of m output ports of said wavelength selector and transmitting a light wave from one of said m output ports to said output port of said hybrid selector only if the wavelength of said light wave is in the range of wavelengths associated with said output port of said wavelength selector, whereby said output system constitutes said wavelength separation system.

3. The selector claimed in claim 2 wherein said intermediate system is an intermediate coupler of class n×m having an input for each of said output ports of said spatial selector and an output for each of said input ports of said wavelength selector and connecting each of said inputs to each of said outputs.

4. The selector claimed in claim 3 wherein the number n of output ports of said spatial selector is equal to the number m of input ports of said wavelength selector.

5. The selector claimed in claim 2 wherein said output system is a multiplexer.

6. The selector claimed in claim 2 wherein said spatial selector, said intermediate coupler and said wavelength selector are carried by a common substrate.

7. The selector claimed in claim 6 wherein said substrate also carries said output system.

8. An optical switching matrix including:

n matrix inputs each adapted to receive an input multiplex made up of light waves associated with m network wavelengths, m.n hybrid selectors each having n input ports and one output port and each adapted to receive a selection instruction and to connect said output port to one of said n input ports designated by said instruction for one of said wavelengths designated by said instruction, and an input coupler connecting each of said matrix inputs to each of said n input ports of said hybrid selector, wherein at least some of said hybrid selectors are selectors according to claim 1.

9. The matrix claimed in claim 8 wherein at least some of said output ports each feed a transponder adapted to perform wavelength matching and/or signal regeneration.

10. The matrix claimed in claim 8 wherein at least some of said output ports form groups each including several such ports and all said output ports of each of said groups feed a multiplexer of said group.

* * * * *